United States Patent
Chu et al.

(10) Patent No.: US 11,886,664 B1
(45) Date of Patent: Jan. 30, 2024

(54) TOUCH DISPLAY AND SENSING METHOD

(71) Applicant: AUO Corporation, Hsinchu (TW)

(72) Inventors: Chia-Hsien Chu, Hsinchu (TW); Chun-Chi Lai, Hsinchu (TW); Ching-Sheng Cheng, Hsinchu (TW)

(73) Assignee: AUO Corporation, Hsinchu (TW)

(*) Notice: Subject to any disclaimer, the term of this patent is extended or adjusted under 35 U.S.C. 154(b) by 0 days.

(21) Appl. No.: 18/089,612

(22) Filed: Dec. 28, 2022

(30) Foreign Application Priority Data

Dec. 14, 2022 (TW) .................................. 111147904

(51) Int. Cl.
G06F 3/041 (2006.01)

(52) U.S. Cl.
CPC ........ *G06F 3/04184* (2019.05); *G06F 3/0412* (2013.01)

(58) Field of Classification Search
None
See application file for complete search history.

(56) References Cited

U.S. PATENT DOCUMENTS

| | | | |
|---|---|---|---|
| 10,579,186 B2 | 3/2020 | Yeh et al. | |
| 2013/0215092 A1* | 8/2013 | Wu | G09G 3/3225 345/206 |
| 2015/0227254 A1* | 8/2015 | Kim | G06F 3/0412 345/174 |
| 2016/0357315 A1* | 12/2016 | Huang | G06F 3/04182 |
| 2020/0004378 A1* | 1/2020 | Liang | G06F 3/0412 |
| 2020/0210011 A1* | 7/2020 | Kim | G06F 3/047 |
| 2023/0016448 A1* | 1/2023 | Ganjali | G06F 3/04184 |

* cited by examiner

Primary Examiner — Christopher R Lamb
(74) Attorney, Agent, or Firm — JCIPRNET

(57) ABSTRACT

A touch display and a sensing method are provided. The touch display includes a substrate, a display array disposed on the substrate and having an upper layer which includes a shielding metal layer, a touch sensor disposed above the display array, and a controller coupled to the display array and the touch sensor. The controller is configured to enable the display array to display and obtain a first sensing result from the touch sensor during a first time interval, and disable the display array and obtain a second sensing result from the touch sensor during a second time interval. According to the first sensing result and the second sensing result, a touch determination result of whether the touch display receives a touch from a user is generated.

13 Claims, 8 Drawing Sheets

TOUCH DISPLAY AND SENSING METHOD

CROSS-REFERENCE TO RELATED APPLICATION

This application claims the priority benefit of Taiwan application serial no. 111147904, filed on Dec. 14, 2022. The entirety of the above-mentioned patent application is hereby incorporated by reference herein and made a part of this specification.

BACKGROUND

Technical Field

The disclosure relates to an electronic device and a method, and in particular, to a touch display and a sensing method.

Description of Related Art

When performing a touch operation on an existing touch display, the touch display needs to display and perform touch sensing at the same time, thereby causing the touch sensor in the touch display to be easily affected by the noise and resulting in the determination error.

SUMMARY

A touch display and a sensing method of the disclosure may improve the misjudgment of the touch sensor.

A touch display of the disclosure includes a substrate, a display array disposed on the substrate and having an upper layer which includes a shielding metal layer, a touch sensor disposed above the display array, and a controller coupled to the display array and the touch sensor. The controller is configured to enable the display array to display and obtain a first sensing result from the touch sensor during a first time interval, and disable the display array and obtain a second sensing result from the touch sensor during a second time interval. According to the first sensing result and the second sensing result, a touch determination result of whether the touch display receives a touch from a user is generated.

A sensing method of the disclosure, applicable to a touch display, which includes a display array and a touch sensor. The display array includes a shielding metal layer located on an upper layer of the display array and below the touch sensor. The sensing method is provided hereafter. The display array is enabled to display and the touch sensor is controlled to obtain a first sensing result during a first time interval. The display array is disabled and the touch sensor is controlled to obtain a second sensing result during a second time interval. According to the first sensing result and the second sensing result, a touch determination result of whether the touch display receives a touch from a user is generated.

Based on the above, the touch display and the sensing method of the disclosure may perform touch sensing to obtain the sensing signal when the display operation is disabled, so as to effectively eliminate the interference of the noise generated during the display operation.

DESCRIPTION OF THE EMBODIMENTS

Figure 1:
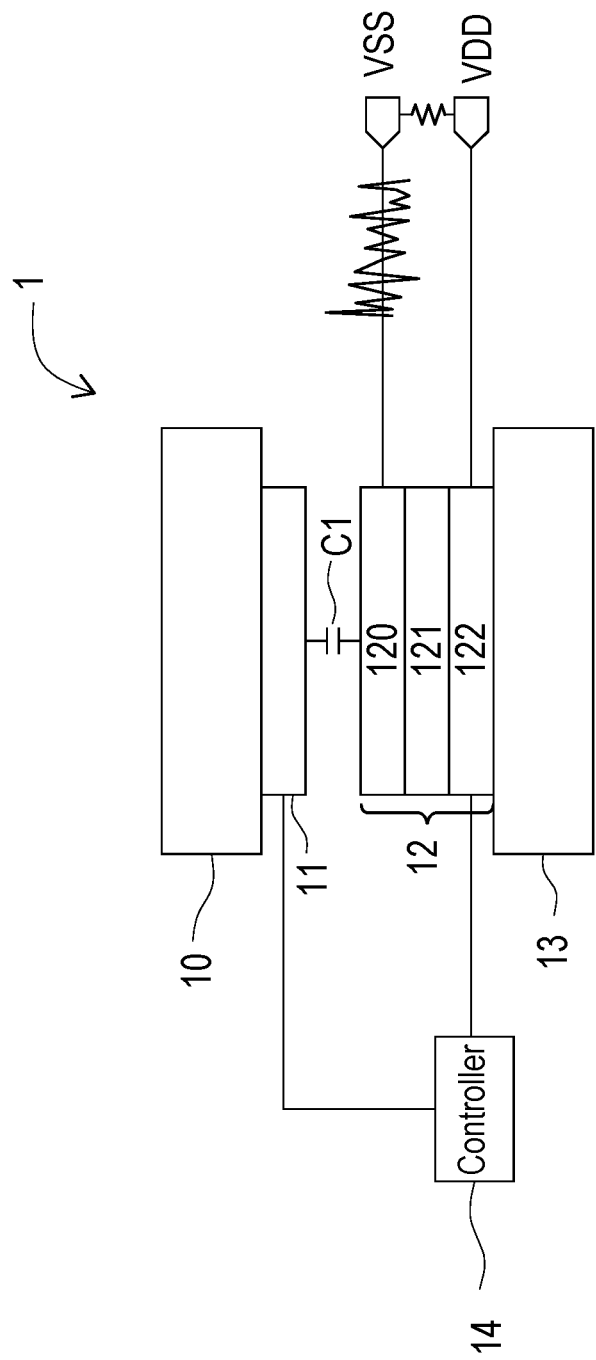
FIG. 1 is a schematic diagram of a touch display according to an embodiment of the disclosure.

FIG. 1 is a schematic diagram of a touch display 1 according to an embodiment of the disclosure. The touch display 1 shown in FIG. 1 includes a sectional side view of some structures and a schematic block diagram of some circuits, which are configured to conceptually illustrate the overall structure and connection relationship of the touch display 1. The touch display 1 includes a transparent sheet 10, a touch sensor 11, a display array 12, a substrate 13, and a controller 14. In terms of structure, the display array 12 is disposed on the substrate 13. The display array 12 also includes a shielding metal layer 120, a display unit layer 121, and a circuit layer 122, and the shielding metal layer 120 is disposed above the overall display array 12. Further, the display array 12 is covered with the transparent sheet 10, and the touch sensor 11 is disposed below the transparent sheet 10. In this way, the display array 12 and the touch sensor 13 are disposed between the substrate 13 and the transparent sheet 10, and the display array 12 is disposed on the substrate 13 and the touch sensor 11 is disposed below the transparent sheet 10, which are disposed in such a way that the touch sensor 11 is disposed adjacent to the shielding metal layer 120 of the display array 12.

In terms of operation, the controller 14 is coupled to the touch sensor 11 and the display array 12. The display array 12 may display images according to the control of the controller 14. On the other hand, the touch sensor 11 may also sense the touch from the user according to the control of the controller 14, and provide the sensing result to the controller 14. In some embodiments, during the first time interval, the controller 14 may enable the display array 12 to display, and control the touch sensor 11 to perform sensing so as to obtain the first sensing result during the first time interval when the display array 12 performs display. Further, during the second time interval after the first time, the controller 14 may disable the display array 12, and control the touch sensor 11 to perform sensing so as to obtain the second sensing result during the second time interval when the display array 12 is not displaying. After the first time interval and the second time interval, the controller 14 may generate the touch determination result of whether the touch display 1 receives the touch from the user according to the first sensing result and the second sensing result.

In an embodiment, the transparent sheet 10 is a glass sheet, and the distance between the touch sensor 11 disposed below the transparent sheet 10 and the shielding metal layer 120 is quite close. For example, the distance between the touch sensor 11 and the shielding metal layer 120 may be less than 5 microns. In this case, the noise generated during the operation of the display array 12 is coupled to the touch sensor 11 through the air (that is, a capacitor C1), thereby causing the touch sensor 11 to generate the wrong sensing result. Although the touch sensor 11 shown in FIG. 1 is disposed below the transparent sheet 10, various disposition positions of the touch sensor 11 should fall within the variation scope of the embodiment. For example, the transparent sheet 10 may also be an elastic flexible substrate, and the touch sensor 11 is disposed above the transparent sheet 10, and the thickness of the transparent sheet 10 may also cause the touch sensor 11 to be affected by the noise on the shielding metal layer 120.

In some embodiments, in order to shield the noise generated by the display array 12, the shielding metal layer 120 disposed on the upper layer of the display array 12 may receive the reference voltage with the fixed voltage level, thereby maintaining the signal integrity of the touch sensor 11 during operation. For example, the shielding metal layer 120 may receive a ground voltage VSS of the display unit layer 121 and the circuit layer 122 as the reference voltage to shield the noise. However, when the reference voltage received by the shielding metal layer 120 is the ground voltage VSS shared by the display unit layer 121 and the circuit layer 122, the circuit disturbance generated by the display array 12 when displaying instead makes the fixed voltage level of the ground voltage VSS to change, and is then coupled to the touch sensor 11 through the capacitor C1. In another example, the shielding metal layer 120 is also lower than the negative voltage of the ground voltage VSS to produce a shielding effect. More specifically, when the display array 12 is displaying, some light emitting elements or driver ics may use the negative voltage lower than the ground voltage VSS to operate, and the shielding metal layer 120 may also receive the display unit layer 121 in the display array 12 and/or the negative voltage used by the circuit layer 122 for shielding.

In some embodiments, in order to make the touch display 1 generate a correct touch determination result, the touch sensor 11 not only performs sensing to obtain the first sensing result when the display array 12 is displaying, but also performs sensing to obtain the second sensing result when the display array 12 as a whole is not displaying. The controller 14 may receive the first sensing result and the second sensing result from the touch sensor 11 to generate the touch determination result, so as to indicate whether the touch display 1 receives the touch from the user. Specifically, during the first time interval, the controller 14 may enable the display array 12 to display and obtain the first sensing result from the touch sensor 11. Moreover, during the second time interval, the controller 14 may disable the display array 12 and obtain the second sensing result from the touch sensor 11. In this way, the controller 11 may generate the touch determination result according to the first sensing result and the second sensing result.

In some embodiments, the touch display 1 may be, for example, a notebook computer, a network computer, a workstation, a personal digital assistant (PDA), a personal computer (PC), a tablet computer, a flexible display, a wearable electronic device, a smart watch, etc.

In some embodiments, the controller 14 may be, for example, a central processing unit (CPU), or other programmable general purpose or special purpose micro control units (MCUs), microprocessors, digital signal processors (DSPs), programmable controllers, application specific integrated circuits (ASICs), graphics processing units (GPUs), arithmetic logic units (ALUs), complex programmable logic devices (CPLDs), field programmable gate arrays (FPGAs), any other kinds of integrated circuits, state machines, advanced RISC machines (ARMs), or other similar components or a combination of the above components. Alternatively, the controller 14 may be designed through a hardware description language (HDL) or any other digital circuit design methods known to those skilled in the art, and may be a hardware circuit implemented through a field programmable gate array (FPGA), a complex programmable logic device (CPLD), or an application-specific integrated circuit (ASIC).

In some embodiments, the display unit layer 121 may include, for example, an organic light emitting diode (OLED), a submillimeter light emitting diode (mini LED), a micro light emitting diode (micro LED), or a quantum dot light emitting diode (QD, such as QLED, QDLED), or a fluorescence, a phosphor, or other suitable materials in which the materials may be disposed in any combination, but are not limited thereto.

Figure 2:
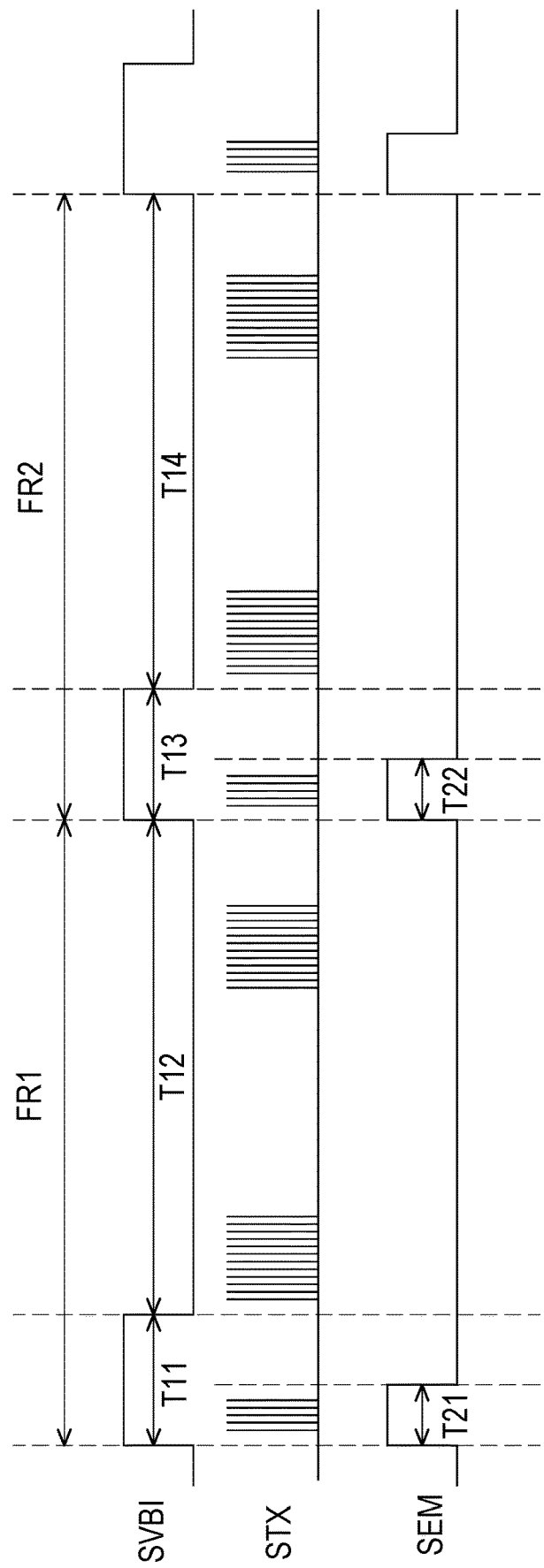
FIG. 2 is a schematic diagram of an operation waveform of the touch display in FIG. 1.

FIG. 2 is a schematic diagram of an operation waveform of the touch display in FIG. 1. FIG. 2 illustrates the waveforms of a vertical blanking signal SVBI, a touch scanning signal STX, and a laser switching signal SEM. The vertical blanking signal SVBI may define frame times FR1 and FR2, and vertical blanking intervals (VBI) T11 and T13. Although not shown in FIG. 1, a vertical blanking signal TVBI is provided to the display array 12 so that the display array 12 as a whole does not perform the display operation during a vertical blanking interval TVBI.

More specifically, the frame times FR1 and FR2 may be divided into the vertical blanking intervals T11 and T13 and display time intervals T12 and T14 respectively by the vertical blanking signal SVBI. During the display time intervals T12 and T14, each row in the display array 12 is controlled to display in sequence. Further, each display time interval is separated by the corresponding vertical blanking interval, and the display array 12 as a whole does not display in the vertical blanking intervals T11 and T13. In the embodiment, the vertical blanking intervals T11 and T13 may be used as the second time interval for sensing and obtaining the second sensing result, and the display time intervals T12 and T14 may be used as the first time interval for sensing and obtaining the first sensing result.

The touch scanning signal STX includes multiple pulses and is provided to the touch sensor 11 so that the touch sensor 11 performs sensing according to the voltage level of the touch scanning signal STX. For example, the touch sensor 11 may be a self-capacitive sensor, and when the touch scanning signal STX is at the high voltage level, the touch sensor 11 may be controlled to perform the charging operation, and when the touch scanning signal STX is the low voltage level, the touch sensor 11 may be controlled to perform the charge transfer operation, so that the touch sensor 11 may determine whether the sensed capacitance value changes according to the amount of charge transfer at the end of each pulse of the touch scanning signal STX, and then generate the corresponding sensing result and provide the sensing result to the controller 14. Of course, other ways of driving the touch sensor 11 to obtain the sensing result also fall within the scope of the variable embodiments, and the embodiment here does not intend to limit.

The laser switching signal SEM may define laser switching time intervals T21 and T22 in each of the vertical blanking intervals T11 and T13. Although not shown in FIG. 1, the laser switching signal SEM is provided to the display array 12, so that the display array 12 as a whole is disabled to display when the laser switching signal SEM is at the disabling voltage level (such as a high voltage level), and the display array 12 as a whole is enabled to display normally when the laser switching signal SEM is at the enabling voltage level (such as a low voltage level).

In this way, in the laser switching time intervals T21 and T22 of the vertical blanking intervals T11 and T13, the controller 14 may provide the laser switching signal SEM at the disabling voltage level (such as a high voltage level) to the display array 12, so that the display array 12 as a whole is disabled. When the display array 12 is disabled, the controller 14 also generates one or more pulses in the touch scanning signal STX, so that the touch sensor 11 may perform sensing in the vertical blanking intervals T11 and T13 and generate the corresponding second sensing result.

Further, during the display time intervals T12 and T14, the controller 14 may provide the laser switching signal SEM at the enabling voltage level to the display array 12, so that the display array 12 is enabled to display normally. At the same time, since the controller 14 controls the laser switching signal SEM to be at the enabling voltage level (such as a low voltage level), and generates one or more pulses in the touch scanning signal STX. Therefore, in the display time intervals T12 and T14, while the display array 12 is displaying, the touch sensor 11 also performs sensing at the same time to generate the first sensing result.

The controller 14 may determine whether the touch display 1 receives the touch determination result of the touch from the user according to the second sensing result and the first sensing result. In an embodiment, it is only when both the second sensing result and the first sensing result show that the touch display 1 receives the touch from the user that the controller 14 generates the touch determination result that the touch display 1 receives the touch from the user. When only the first sensing result shows that the touch display 1 receives the touch from the user, but the second sensing result shows the contrary, the controller 14 generates the touch determination result that the touch display 1 has not received the touch from the user. In detail, since the first sensing result is obtained by sensing while the display array 12 is displaying, the first sensing result may be affected by the noise of the display array 12. Accordingly, the controller 14 may refer to the second sensing result obtained in the undisturbed vertical blanking intervals T11 and T13, and generate the touch determination result that the touch display 1 receives the touch from the user, when both the second sensing result and the first sensing result show that the touch display 1 receives the touch from the user. In this way, the touch display 1 may effectively eliminate the situation where the touch sensor 11 is interfered by the display array 12 and generates the determination error.

Figure 3:
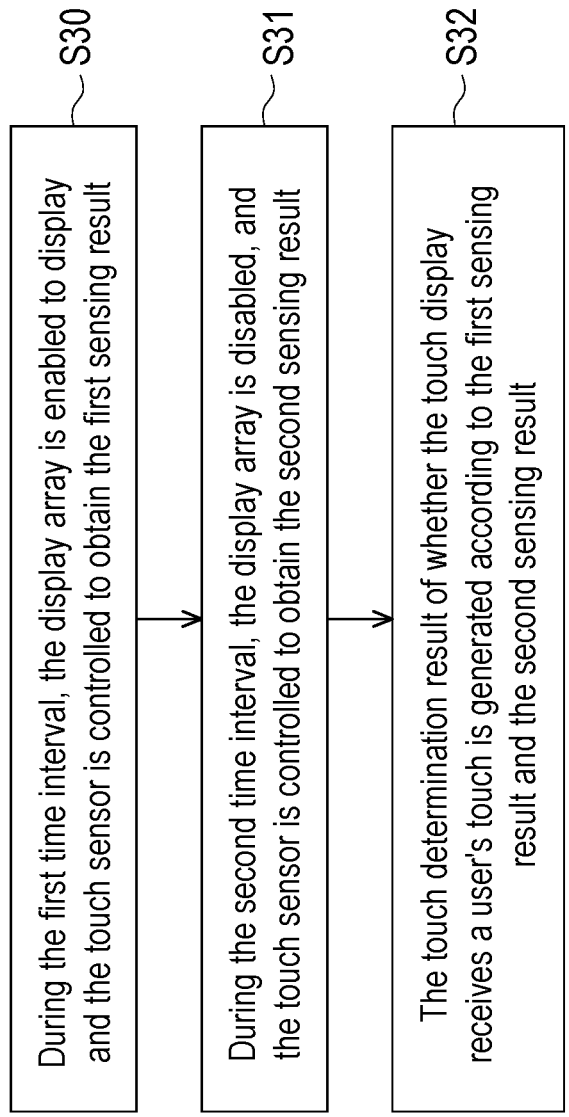
FIG. 3 is a flow diagram of a sensing method according to an embodiment of the disclosure.

FIG. 3 is a flow diagram of a sensing method according to an embodiment of the disclosure. Generally speaking, the above-mentioned operation description of the touch display 1 in FIG. 2 may be summarized as the sensing method in FIG. 3, and may be applied to the touch display 1 in FIG. 1.

In detail, the sensing method shown in FIG. 3 includes steps S30-S32. In step S30, during the first time interval, the display array is enabled to display, and the touch sensor is controlled to perform sensing to obtain the first sensing result. That is to say, the touch display 1 may control the display array 12 through the controller 14 to obtain the first sensing result while displaying.

In step S31, during the second time interval, the display array is disabled, and the touch sensor is controlled to perform sensing to obtain the second sensing result. That is to say, the controller 14 may control the touch sensor 11 to sense and obtain the second sensing result while controlling the display array 12 not to display. Since the second sensing result is obtained when the display array 12 is not displaying, the second sensing result may be used as the basis for assisting in determining whether the user touches or not.

In step S32, according to the first sensing result and the second sensing result, the touch determination result of whether the touch display receives the touch from the user is generated. Therefore, the controller 14 of the touch display 1 may generate the corresponding touch determination result when both the first sensing result and the second sensing result show that the touch display 1 receives the touch from the user.

Figure 4:
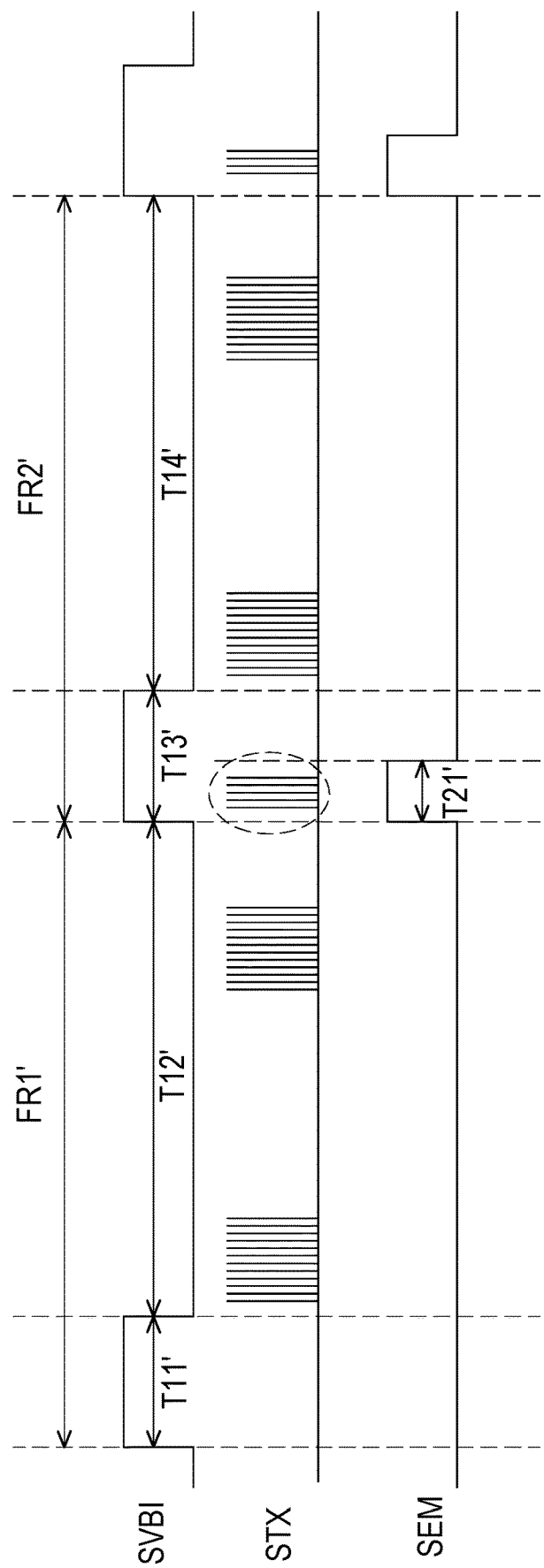
FIG. 4 is a schematic diagram of another operation waveform of the touch display in FIG. 1.

FIG. 4 is a schematic diagram of another operation waveform of the touch display 1 in FIG. 1. Generally speaking, the signals shown in FIG. 4 and FIG. 2 are the same, including the vertical blanking signal SVBI, the touch scanning signal STX, and the laser switching signal SEM, so for the description of how these signals are provided and control the touch display 1 and the internal circuits thereof, please refer to the relevant description of FIG. 2 in the above paragraph.

In FIG. 4, the vertical blanking signal SVBI may define frame times FR1' and FR2', vertical blanking intervals T11' and T13', and display time intervals T12' and T14'. In the embodiment, when the controller 14 determines that the touch display 1 has not received the touch from the user before the frame time FR1', the controller 14 may maintain the laser switching signal SEM in the vertical blanking interval T11' at the enabling voltage level (such as a low voltage level), and control the touch scanning signal STX at the fixed voltage level without pulses. Therefore, the touch display 1 only performs touch sensing in the display time interval T12' during the frame time FR1', and obtains the corresponding first sensing result.

Furthermore, when the controller 14 determines that the first sensing result provided by the touch sensor 11 in the display time interval T12' shows that the touch display 1 receives the touch from the user, the controller 14 controls the laser switching signal SEM accordingly to switch to the disabling voltage level (such as a high voltage level) in the vertical blanking interval T13', so as to distinguish a laser switching time interval T21'. In addition, in the laser switching time interval T21' of the vertical blanking interval T13', the controller 14 also controls to generate one or more pulses in a touch scanning signal STX5, and then controls the touch sensor 11 to perform sensing and obtain the second sensing result. In this way, when the controller 14 determines that the second sensing result sensed by the touch sensor 11 in the vertical blanking interval T13' also shows that the touch display 1 receives the touch from the user, the controller 14 may generate the touch determination result accordingly that the touch display 1 receives the touch from the user.

Figure 5:
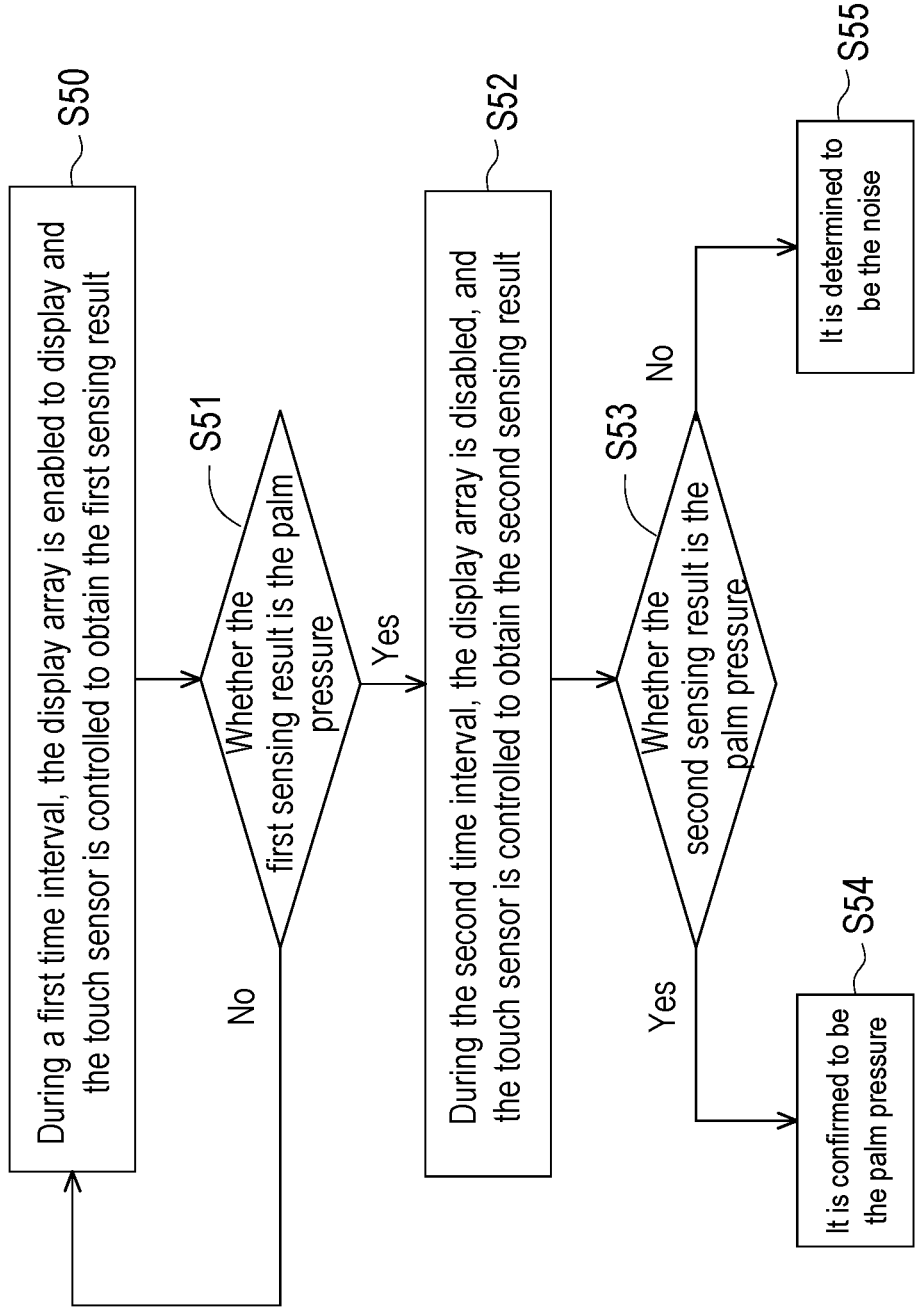
FIG. 5 is a flow diagram of a sensing method according to an embodiment of the disclosure.

FIG. 5 is a flow diagram of a sensing method according to an embodiment of the disclosure. Generally speaking, the above-mentioned operation description of the touch display 1 in FIG. 5 may be summarized as the sensing method in FIG. 5, and may be applied to the touch display 1 in FIG. 1.

In detail, the sensing method in FIG. 5 includes steps S50-S55. In step S50, the display array is enabled to display during the first time interval, and the touch sensor is controlled to perform sensing to obtain the first sensing result. That is to say, the touch display 1 may control the display array 12 through the controller 14 to obtain the first sensing result while displaying.

In step S51, it is determined whether the first sensing result is a palm pressure touch. In detail, the purpose of determining whether the first sensing result is the palm pressure touch is to determine whether the first sensing result may be interfered by the noise. In the touch display 1, since the shielding metal layer 120 is laid on a large area, when the noise is coupled to the touch sensor 11 through the shielding metal layer 120 and affects the sensing result, the touch sensor 11 is caused to sense the sensing result similar to receiving the palm pressure touch from the user. Therefore, in the embodiment, the sensing method may measure whether to further control the touch display 1 to obtain the second sensing result by determining whether the first sensing result shows that the palm pressure touch from the user is received.

When the determination result in step S51 is negative, it means that the first sensing result received by the touch sensor 11 is not affected by the noise from the shielding metal layer 120, so the sensing method returns to step S50 so as to continue sensing.

When the determination result in step S51 is positive, it means that the first sensing result received by the touch sensor 11 is affected by the noise from the shielding metal layer 120, so the sensing method enters step S52 to control the touch display 1 to perform sensing so as to obtain the second sensing result.

In step S52, during the second time interval, the display array is disabled, and the touch sensor is controlled to perform sensing to obtain the second sensing result. That is to say, the controller 14 may control the touch sensor 11 to sense and obtain the second sensing result while controlling the display array 12 not to display. Since the second sensing result is obtained when the display array 12 is not displaying, the second sensing result may be used as the basis for assisting in determining whether the user touches or not.

In step S53, it is determined whether the second sensing result is a palm pressure touch. When the second sensing result also shows that the touch display 1 receives the palm pressure from the user, the sensing method may enter step S54 to generate the touch determination result confirming that the touch display 1 receives the palm pressure from the user. If the second sensing result does not show that the touch display 1 receives the palm pressure from the user, the sensing method may enter step S55 to generate the touch determination result of the first sensing result having the noise.

Figure 6B:
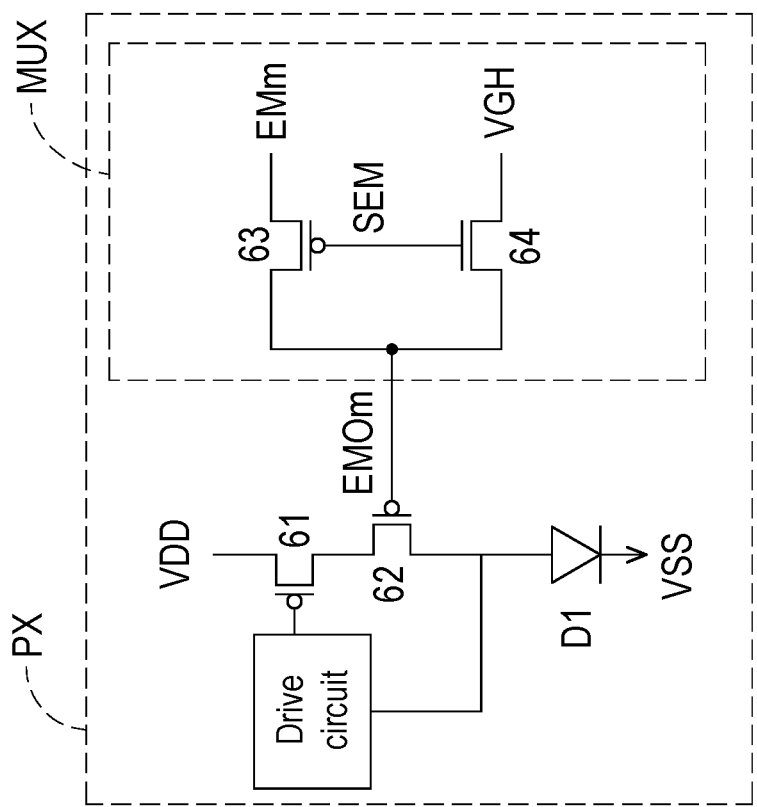
FIG. 6B is a circuit diagram of the pixel circuit in FIG. 6A.
Figure 6A:
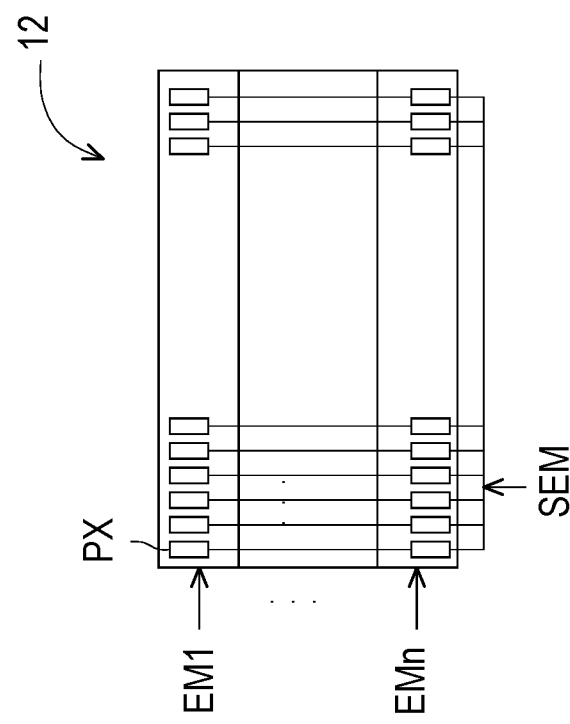
FIG. 6A is a schematic circuit diagram of an embodiment of driving a display array in FIG. 1.

FIG. 6A is a schematic circuit diagram of an embodiment of driving the display array 12 in FIG. 1. Generally speaking, the top view of the display array 12 is presented in FIG. 6A. For convenience of description, some structures or components of the display array 12 are omitted in FIG. 6A. The display array 12 includes multiple pixel circuits PX disposed in an array, and each laser signal EM1-EMn is provided to the corresponding row in the display array 12, so that the pixel circuit PX on the same row may be driven by one of the corresponding laser signals EM1-EMn to display. In addition to the display array 12 being driven by the laser signals EM1-EMn, the laser switching signal SEM is also provided to all the pixel circuits PX of the display array 12, so that all the pixel circuits PX may also perform the display operations according to the laser switching signal SEM.

FIG. 6B is a circuit diagram of the pixel circuit PX in FIG. 6A. In the embodiment, the touch display 1 further includes a multiplexer circuit MUX, which is disposed in each pixel circuit PX. In detail, the pixel circuit PX includes transistors 61 and 62, a light emitting diode D1, and a driver ic 60. The transistors 61 and 62 and the light emitting diode D1 are connected in series between an operating voltage VDD and the ground voltage VSS. The driver ic 60 is coupled to the gate of the transistor 61 to receive display data to control the magnitude of the current flowing through the transistor 61, thereby adjusting the brightness of the diode D1. The transistor 62 is controlled by the laser signal to be turned on or off, and serves as a switch of the overall pixel circuit PX. Further, the multiplexer circuit MUX is coupled to the gate of the transistor 62 for receiving the laser switching signal SEM provided by the controller 14, so as to selectively provide the laser signal EM or a disabling signal VGH to the gate of the transistor 62.

In detail, since the transistor 62 is a P-type metal oxide silicon field effect transistor (PMOSFET), the transistor 62 is turned off by the high voltage level and turned on by the low voltage level. Further, the multiplexer circuit MUX includes transistors 63 and 64. The transistors 63 and 64 are P-type and N-type transistors, respectively. When the sources of the transistors 63 and 64 are jointly coupled to the gate of the transistor 62, and the gates of the transistors 63 and 64 jointly receive the laser switching signal SEM, the transistors 63 and 64 may act as two switches, and one of the laser signal EMm received by the drain of the transistor 63 or the disabling signal VGH received by the drain of the transistor 64 is transmitted to the gate of the transistor 62 as an output laser signal EMO according to the control of the laser switching signal SEM.

When the laser switching signal SEM is at the high voltage level, the multiplexer circuit MUX may select the disabling signal VGH as the output laser signal EMO and provide to the transistor 62, so that the transistor 62 in the pixel circuit PX is turned off, thereby disabling the display operation of the laser switching signal SEM. On the other hand, when the laser switching signal SEM is at the low voltage level, the multiplexer circuit MUX may select the laser signal EM as the output laser signal EMO and provide to the transistor 62, so that the transistor 62 in the pixel circuit PX may perform the display operation according to the control of the laser signal EM.

Figure 7:
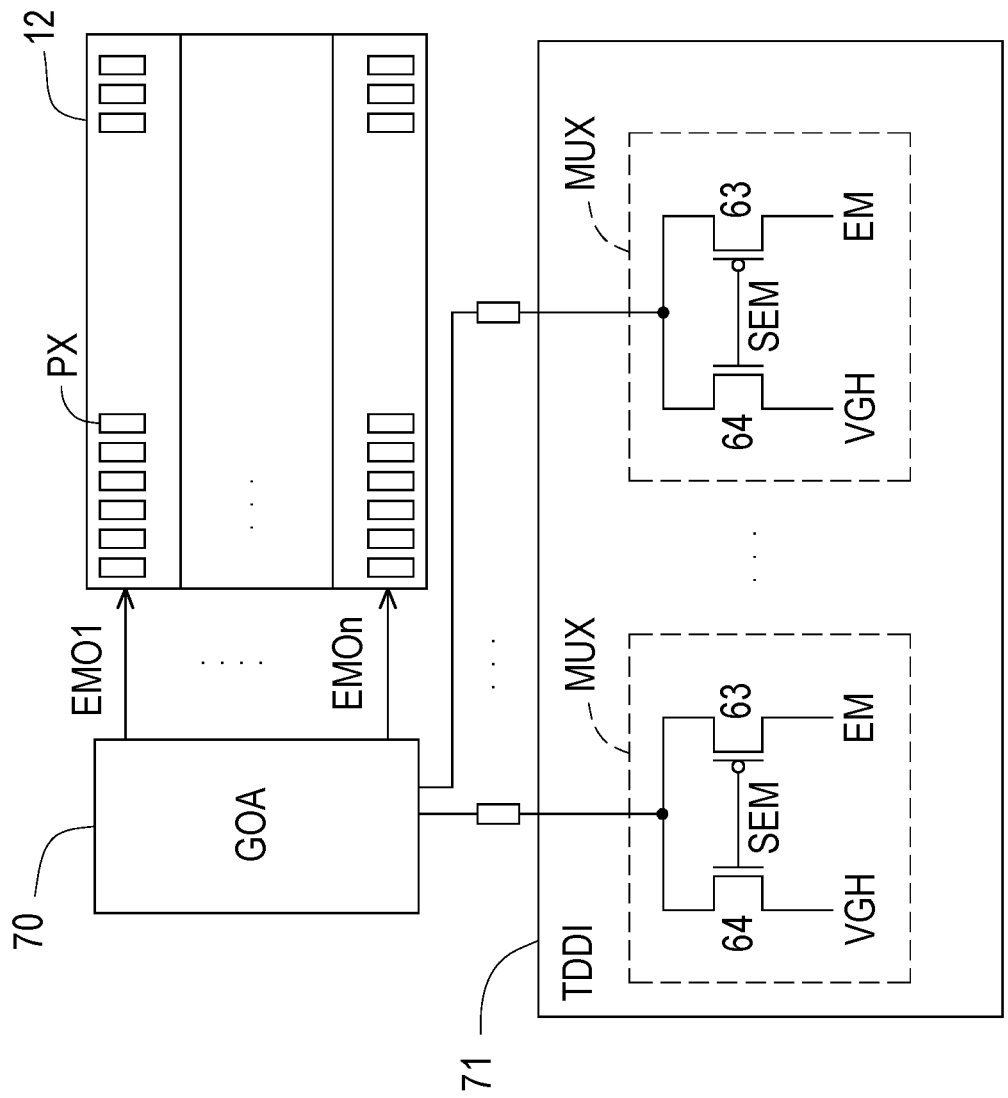
FIG. 7 is a schematic circuit diagram of another embodiment of driving a display array in FIG. 1.

FIG. 7 is a schematic circuit diagram of another embodiment for driving the display array 12 in FIG. 1. Generally speaking, except that the top view of the display array 12 is presented in FIG. 7, and a gate circuit on array (GOA) 70 and a touch display driver ic (TDDI) 71 included in the touch display 1 in the embodiment is also represented in FIG. 7 as block diagrams, so as to present the connection relationship between the display array 12, the gate circuit on array 70, and the touch display driver ic 71. For convenience of description, some structures or components of the display array 12 are omitted in FIG. 7.

In detail, the gate circuit on array 70 may drive and provide the output laser signals EMO1 to EMOn to the respective row of the display array 12. Furthermore, the touch display driver ic 71 may include multiple multiplexer circuits MUX to selectively provide the laser signal EM or the disabling signal VGH to the gate circuit on array 70 for driving according to the control of the laser switching signal SEM. In this way, the number of the multiplexer circuits MUX required by the touch display 1 may be effectively reduced.

Figure 8:
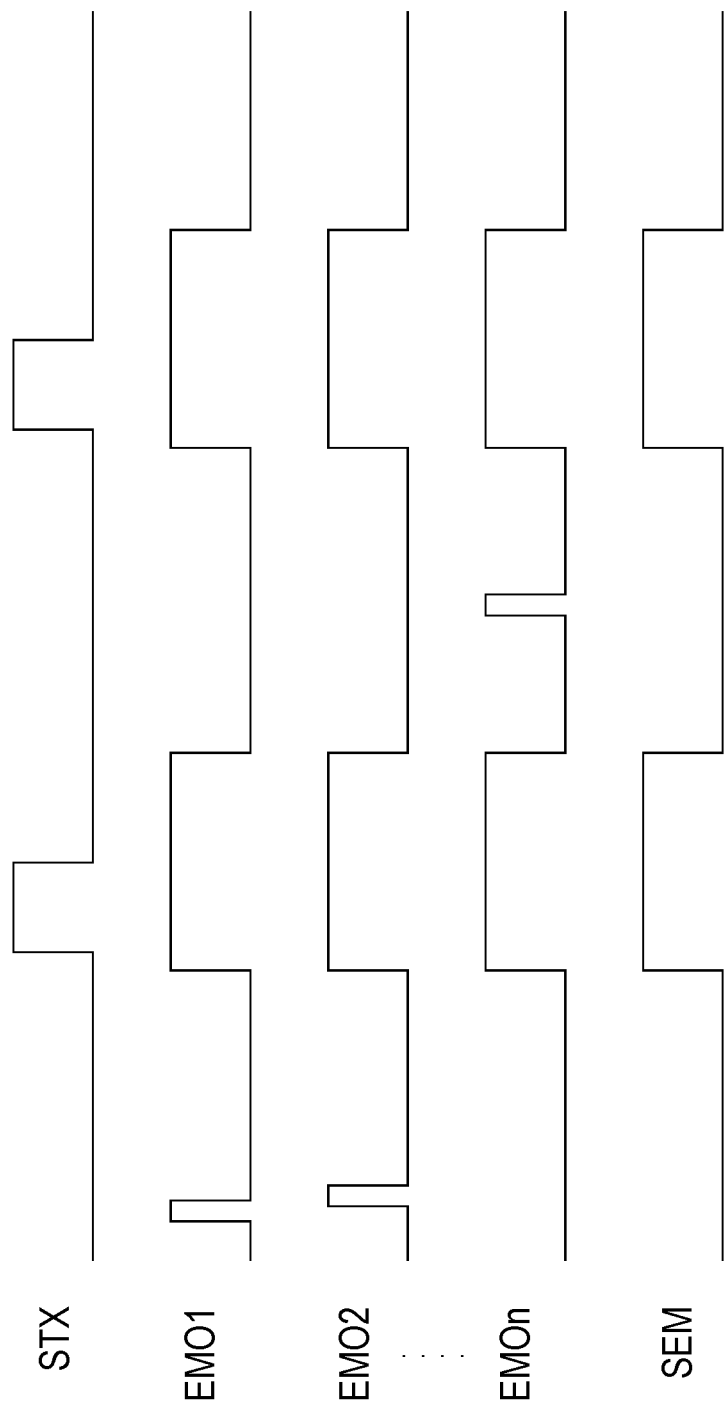
FIG. 8 is a schematic diagram of a driving signal waveform configured to drive the display array in FIG. 6A and FIG. 7.

FIG. 8 is a schematic diagram of a driving signal waveform configured to drive the display array 12 in FIG. 6A and FIG. 7. FIG. 8 shows the waveform diagrams of the touch scanning signal STX, the output laser signals EMO1 to EMOn, and the laser switching signal SEM.

In detail, the touch scanning signal STX is the driving signal for controlling the touch sensor 11, and each pulse may control the touch sensor 11 to perform the charging and charge transfer operations, thereby obtaining the sensing result. The output laser signals EMO1 to EMOn respectively represent the laser signal received by the pixel circuit PX in the first row to the nth row of the display array 12. The laser switching signal SEM is the driving signal for controlling all the pixel circuits PX in the display array 12 to be disabled.

As shown in FIG. 8, when the laser switching signal SEM is at the enabling voltage level (for example, a low voltage level), the pixel circuits PX in the display array 12 are driven in sequence by the output laser signals EMO1 to EMOn. In addition, when the laser switching signal SEM is switched to the disabling voltage level (such as a high voltage level), all the output laser signals EMO1-EMOn are correspondingly switched to the disabling voltage level (such as a high voltage level), thereby causing all pixel circuits PX in the display array 12 to be disabled and not display.

To sum up, the touch display and the sensing method in the above embodiments may perform touch sensing to obtain the sensing signal when the display operation is disabled, so as to effectively eliminate the interference of the noise generated during the display operation and the resulting determination error by the sensor.

What is claimed is:

1. A touch display, comprising:
   a substrate;
   a display array, disposed on the substrate, wherein an upper layer of the display array comprises a shielding metal layer;
   a touch sensor, disposed above the display array; and
   a controller, coupled to the display array and the touch sensor, wherein the controller is configured to:
   enable the display array to display and obtain a first sensing result from the touch sensor during a first time interval;
   disable the display array and obtain a second sensing result from the touch sensor during a second time interval, wherein the controller disables the display array during the second time interval and obtains the second sensing result from the touch sensor only after the first sensing result shows that the touch display receives a palm pressure touch from the user; and
   generate a touch determination result of whether the touch display receives a touch from a user according to the first sensing result and the second sensing result.

2. The touch display according to claim 1, wherein the display array further comprises a circuit layer and a display unit layer, and the shielding metal layer is disposed above the circuit layer and the display unit layer and below the touch sensor.

3. The touch display according to claim 1, wherein the first time interval is a display time interval, and the second time interval is a vertical blanking interval (VBI).

4. The touch display according to claim 1, wherein the controller generates the touch determination result that the touch display receives the touch from the user when both the first sensing result and the second sensing result show that the touch display receives the touch from the user.

5. The touch display according to claim 1, wherein the display array comprises a plurality of pixel circuits disposed in an array, and each pixel circuit comprises:
   a light emitting diode (LED); and
   a first transistor, connected in series with the light emitting diode (LED), wherein the first transistor is configured to receive a first laser signal to control a current provided to the light emitting diode (LED);
   wherein the touch display also comprises:
   a multiplexer circuit, configured to selectively provide a second laser signal or a disabling signal to a gate of the first transistor by receiving a laser switching signal provided by the controller.

6. The touch display according to claim 5, wherein the first transistor in each pixel circuit is a first P-type metal oxide silicon field effect transistor (PMOSFET), and the multiplexer circuit comprises:
   a second P-type transistor, wherein a drain of the second P-type transistor receives the second laser signal, a source of the second P-type transistor is coupled to the gate of the first P-type transistor, and a gate of the second P-type transistor receives the laser switching signal; and
   a first N-type metal oxide silicon field effect transistor (NMOSFET), wherein a drain of the first N-type transistor receives the disabling signal, a source of the first N-type transistor is coupled to the gate of the first P-type transistor, and a gate of the first N-type transistor receives the laser switching signal.

7. The touch display according to claim 6, wherein the controller provides the laser switching signal having a disabling voltage level during the second time interval, so that all pixel circuits in the display array receive are disabled after receiving the disabling signal.

8. The touch display according to claim 5, wherein the multiplexer circuit is disposed in each pixel circuit, or the multiplexer circuit is disposed in a touch display driver is outside the display array.

9. A sensing method, applicable to a touch display, wherein
   the touch display comprises a display array and a touch sensor, the display array comprises a shielding metal layer located on an upper layer of the display array and below the touch sensor, and the sensing method comprises:
   enabling the display array to display and controlling the touch sensor to obtain a first sensing result during a first time interval;
   disabling the display array and controlling the touch sensor to obtain a second sensing result during a second time interval, wherein disabling the display array during the second time interval and controlling the touch sensor to obtain the second sensing result is performed only after the first sensing result shows that the touch display receives a palm pressure touch from the user; and
   generating a touch determination result of whether the touch display receives a touch from a user according to the first sensing result and the second sensing result.

10. The sensing method according to claim 9, wherein the first time interval is a display time interval, and the second time interval is a vertical blanking interval (VBI).

11. The sensing method according to claim 9, further comprising:
    generating the touch determination result that the touch display receives the touch from the user when both the first sensing result and the second sensing result show that the touch display receives the touch from the user.

12. The sensing method according to claim 9, wherein the display array comprises a plurality of pixel circuits disposed in an array, and the sensing method further comprises:
    providing a laser switching signal so as to selectively provide a second laser signal or a disabling signal to each pixel circuit of the display array.

13. The sensing method according to claim 12, further comprising:

controlling the laser switching signal at a disabling voltage level during the second time interval, so that all pixel circuits in the display array are disabled after receiving the disabling signal.

\* \* \* \* \*